(12) United States Patent
Cox et al.

(10) Patent No.: US 7,220,688 B2
(45) Date of Patent: May 22, 2007

(54) FIBROUS WEB AND A METHOD FOR MANUFACTURING A SHAPED ARTICLE BY IMPREGNATING SAID WEB WITH A LIQUID RESIN AND A HARDENER THEREFOR

(75) Inventors: Marinus J. F. Cox, Tiel (NL); Pieter Anjema, Veenendaal (NL)

(73) Assignee: Lantor B.V., Veenendaal (NL)

( * ) Notice: Subject to any disclaimer, the term of this patent is extended or adjusted under 35 U.S.C. 154(b) by 31 days.

(21) Appl. No.: 10/237,412

(22) Filed: Sep. 9, 2002

(65) Prior Publication Data
US 2003/0040237 A1 Feb. 27, 2003

Related U.S. Application Data

(63) Continuation of application No. 09/126,903, filed on Jul. 31, 1998, now abandoned.

(30) Foreign Application Priority Data

| Aug. 8, 1997 | (EP) | 97202453 |
|---|---|---|
| Apr. 3, 1998 | (EP) | 98201063 |

(51) Int. Cl.
B32B 27/04 (2006.01)
(52) U.S. Cl. ............ 442/103; 442/164; 442/178; 442/180; 442/417; 156/326
(58) Field of Classification Search ............ 442/59, 442/58, 43, 103, 417, 164, 178, 180; 156/326
See application file for complete search history.

(56) References Cited

U.S. PATENT DOCUMENTS

| 4,818,583 A | 4/1989 | Geel |
| 5,017,427 A * | 5/1991 | Machida et al. ............ 428/323 |
| 5,089,548 A | 2/1992 | Zimmel et al. |
| 5,270,209 A | 12/1993 | Rigg et al. |

* cited by examiner

Primary Examiner—Andrew T. Piziali
(74) Attorney, Agent, or Firm—Banner & Witcoff, Ltd.

(57) ABSTRACT

The invention is concerned with a fibrous web for making a shaped article reinforced with fibrous webbing by impregnating the web with a liquid resin and a hardener therefor, wherein said web comprises indicating means, which indicate the impregnation of the web with said liquid resin and said hardener.

6 Claims, No Drawings

FIBROUS WEB AND A METHOD FOR MANUFACTURING A SHAPED ARTICLE BY IMPREGNATING SAID WEB WITH A LIQUID RESIN AND A HARDENER THEREFOR

CROSS REFERENCE TO RELATED APPLICATION

This application is a continuation of U.S. application Ser. No. 09/126,903 filed on Jul. 31, 1998, now abandoned.

BACKGROUND OF THE INVENTION

Field of the Invention

The invention relates to a fibrous web and a method for manufacturing a shaped article by impregnating said web with a liquid resin and a hardener therefor.

Fibrous webs, such as webs of glass fiber, metal fiber, ceramic fiber or synthetic fibers, such as acrylic, polyester, polyamide or polypropylene fibers, are extremely suitable as a reinforcement for all kinds of cured synthetic plastics materials, such as polyester resin or epoxy resin. Generally, the incorporation of a fibrous web in a resin material results in increased strength, stiffness, fatigue life, fracture toughness, environmental resistance and reduced weight and manufacturing cost of said resin material.

U.S. Pat. No. 3,676,288 discloses the application to, or incorporation in, a fibrous web of non-expanded microspheres by means of a binder, for example, a polyacrylonitrile latex. As the binder is dried and crosslinked, the spheres are attached to the fibrous web and expanded.

The European patent application 0 190 788, which is incorporated herein by reference, is directed to the use of a fibrous web of, for instance, glass fiber, incorporating microspheres, for the manufacture of objects reinforced with such a fibrous web, by impregnating the web with liquid resin and a hardener therefor. According to the invention of said patent application, the microspheres are mainly contained within the web and arranged in a pattern in which areas of the web, which contain microspheres, are separated from each other by areas which contain virtually no microspheres.

For several decades, the manufacturing of shaped articles reinforced with fibrous webs, provided with microspheres or not, has mostly been performed manually, even at commercial production sites. Although automated production has proven to be possible in so-called closed mold systems, the equipment, including the mold itself, necessary for this type of production requires a huge investment. Therefore, this type of production can, from an economic point of view, only be opted for in case a large number of objects having the same spatial specifications is to be manufactured.

Resins reinforced with fibrous webs, are often used for manufacturing shaped articles such as automotive or industrial parts, e.g. tanks, bath tubs, road signs, cladding panels, boats, caravans, etc. Therefore, the manufacturers that utilize these materials are generally companies having small production facilities or producing a small number of product units. Thus, these manufacturers will generally have to rely on the skilled manual labor which is required for manufacturing shaped articles being satisfactory in quality.

The first step in the manual manufacturing of shaped articles reinforced with fibrous webs, is the provision of a mold. On the inner side of this open mold, sheets of the fibrous web are laid out so as to completely cover the area of the mold. Subsequently, the fibrous web is impregnated with a liquid resin and a hardener, and finally the resin is cured to result in the shaped article.

The most difficult step of this manufacturing procedure, which requires great skill, is the application of the resin and hardener to the sheets of the fibrous web in the mold. The resin and hardener are applied simultaneously in the form of a viscous mixture. It is crucial to the quality and the reproducibility of the final product, the shaped article, that the mixture is applied evenly and that the fibrous web is impregnated with the resin to a sufficient extent. For the determination of the point at which enough resin has been applied throughout the web, which is often referred to as the determination of the point of saturation of the fibrous web with resin, a lot of experience and skill are needed.

In view of the above described difficulties, it is highly desirable that the known manual manufacturing processes of shaped articles reinforced with fibrous webs are simplified, so that they require less skill and training to perform.

BRIEF SUMMARY OF THE INVENTION

It has now been found that the manufacturing of shaped articles reinforced with fibrous webs in open molds can be significantly simplified, and thus improved, by using a fibrous web which satisfies a number of specific criteria. Accordingly, the invention is directed to a fibrous web for making a shaped article reinforced with fibrous webbing by impregnating the web with a liquid resin and a hardener therefor, wherein said web comprises indicating means, which indicate the impregnation of the web with said liquid resin.

Using a fibrous web according to the invention, a shaped article reinforced with a fibrous web can be manufactured without encountering the above described difficulties which, until now, were inevitable. In addition, a manufacturing process of such shaped articles is much less time-consuming and is much easier to learn to perform.

DETAILED DESCRIPTION OF THE INVENTION

According to the invention, a fibrous web comprises indicating means. Preferably, these indicating means show a change of color, for example a decolorization, upon the impregnation of the web with liquid resin. That way, it can easily be determined during the impregnation of a fibrous web according to the invention when sufficient resin has been applied. The degree of the color change may be used as a measure of the extent of impregnation.

Due to said change of color, it can also easily be determined whether sufficient resin has been applied throughout the fibrous web, as the indicating means may also be present throughout the fibrous web. It is of course well within the capabilities of a skilled artisan to choose the indicating means so that no significant, undesired effects on the final color of a shaped article to be manufactured are encountered.

It has been found that highly suitable indicating means for the purpose of determining whether a fibrous web has been saturated with liquid resin, are vat dyes, disperse dyes, direct dyes, alkaline dyes and acid/base indicator dyes, which show a color transition upon the impregnation.

Particularly suitable as indicating means according to the invention are acid/base indicator dyes. The resins used for the impregnation usually are acidic in nature and can convert the alkaline dye in an acid-base reaction to a product having substantially no color. Of these acid/base indicator dyes, phtalein-, sulphonephtalein- and azo-indicators are preferred. In accordance with the invention, it has been found that very good results are obtained with bromine thymol blue, bromine cresol purple, bromine cresol green, chlorine phenol red, and methyl red as indicating means.

The amounts of indicating means present in a fibrous web are generally between 0.01 and 2.5, preferable between 0.05 and 2.0 wt. %, based on the weight of the fibrous web. In fact, the amount of indicating means is not critical, as long as no interference with the impregnation and curing processes occurs.

A fibrous web according to the invention will usually be a non-woven, which may be reinforced, based on conventional fibers. The manufacture of suitable non-wovens has for instance been described by Dr. H. Jörder, Textilien auf Vliesbasis (D. V. R. Fachbuch, P. Kepper Verlag). Suitable fibers on which the web may be based are metal fibers, ceramic fibers, mineral fibers, glass fibers, carbon fibers, or fibers of synthetic plastic materials. It is also possible to use a combination of a non-woven fibrous web with a reinforcing fabric, one within or on top of the other.

Preferably, a fibrous web according to the invention is provided with microspheres. The use of microspheres in combination with a fibrous web results in a considerable saving of resin and fibers. Moreover, a product reinforced with a web provided with microspheres has excellent mechanical properties, such as rigidity, impact resistance and thermal insulation capacity.

The microspheres that may be provided in a fibrous web according to the invention preferably consist of a thermoplastic synthetic resin material that is solid at room temperature. Examples of suitable resins include polystyrene, styrene copolymers, polyvinyl chloride, vinyl chloride copolymers, vinylidene chloride copolymers and so forth.

In the microspheres, a blowing agent has been incorporated. The presence of this blowing agent is responsible for an expansion of the microspheres when a fibrous web, comprising the microspheres, is cured. Thus, the microspheres are pressed into the fibrous web in unexpanded form, for example by means of a paste, such as a foam paste. The blowing agent may be a chemical or physical blowing agent, such as azodicarbonamide, isobutane, freon and so forth.

The microspheres advantageously have a diameter of 4–20 μm in unexpanded state, and a diameter of preferably 10–100 μm in expanded state. After expansion of the microspheres, the amount thereof in the web is in general 10 to 60 vol. %. This amount depends on the amount of microspheres used and the degree of expansion thereof.

In accordance with one embodiment, the microspheres are distributed homogeneously throughout the fibrous web. According to this embodiment, the microspheres may be provided in the web by impregnation techniques.

In another embodiment, the microspheres are disposed mainly within the web and arranged in a pattern in which areas of the web which contain microspheres are separated from each other by areas which contain virtually no microspheres. In a fibrous web in accordance with this embodiment, the microspheres may be arranged so as to form a pattern of 'islands', which are separated from each other by areas (channels) containing no microspheres, but only fibers. Preferably, the microspheres are arranged in a regular pattern.

Hereinabove, it has been described how a fibrous web is provided, which solves the problem of determining the impregnation of a fibrous web with a liquid resin and a hardener therefor when said web is impregnated with said resin and said hardener. Another problem in the manufacturing of shaped articles using impregnated fibrous webs relates to the shapeability of such materials. It has been shown to be particularly difficult to perform an impregnation of a fibrous web with liquid resin and a hardener therefor in a satisfactory manner, when the web has not been fitted closely enough into the mold as a result of its inadequate shapeability.

In practice, it has been found that it is very difficult to manufacture objects or articles having a very complex form, such as sailing boats, truck wind deflectors, car body parts and so forth, of a fibrous web impregnated with liquid resin and a hardener therefor. This difficulty resides mostly in the stiffness of the fibrous web, which has to be closely fitted to the interior surface of a mold in the manufacture of the object or article.

It has now been found that this problem may be solved by the provision of a fibrous web for making a shaped article reinforced with fibrous webbing by impregnating the web with a liquid resin and a hardener therefor, wherein said web comprises 30–70%, preferably 40–60%, of fibers of 3–4 dtex having a length of 20–35 mm, preferably 25–30 mm, and wherein the remaining fibers are 1–2.5 dtex fibers having a length of 30–50 mm, preferably of 35–45 mm. The result of this specific distribution of the fiber length in a fibrous web is an improved shapeability during application, which can be expressed in terms of a deformation factor. The edformation factor may be defined as the ratio of the wet strength in machine direction and the wet strength in cross direction.

According to this embodiment of the present invention, wherein a fibrous web has a specific distribution of fibers having different lengths, it has been found that the above described problems concerning the fitting of a fibrous web into a mold may be overcome. The distribution of the fibers throughout the web is preferably homogeneous.

A fibrous web according to the invention can be prepared in a number of ways, e.g. by use of a printing method, wherein a crosslinkable carrier material in the form of a paste-like physical condition containing microspheres and indicating means is brought into the fibrous web, or by use of a so-called Foulard method as has been described in the above cited U.S. Pat. No. 3,676,288. This paste-like material consists mainly of a binder for the microspheres and a fibrous web.

Suitable binders in this regard are for instance lower alkyl acrylate polymer, styrene-butadiene rubber, acrylonitrile polymer, polyurethane, epoxy resins, polyvinyl chloride, polyvinylidene chloride, and copolymers of vinylidene chloride with other monomers, polyvinyl acetate, partially hydrolyzed polyvinyl acetate, polyvinyl alcohol, polyvinyl pyrrolidone, polyester resins, and so forth. Optionally these binders can be provided with acidic groups, for example by carboxylating the binders. A suitable carboxylating agent is, for example, maleic anhydride. In addition, the binder, paste-like composition optionally contains water, surfactants, foam stabilizers, fillers and or thickeners, as has been described in EP-A-0 190 788.

Of course, the invention also encompasses a method for manufacturing a shaped article, wherein a fibrous web as described hereinabove is impregnated with a liquid resin and a hardener therefor.

Suitable liquid resins for impregnating a fibrous web according to the invention are any synthetic plastic materials that can be applied in liquid form and be cured. Examples are polyester resins. Given the specifications of a shaped article to be manufactured, a skilled artisan will be able to suitably select an appropriate resin.

Suitable hardeners for use in a method according to the invention are any hardeners which can be used to cure the chosen liquid resin. These systems are known to the skilled person. It belongs to the standard knowledge of the person skilled in the art to be able to combine resin and hardener so as to obtain optimum results. Examples are methylethylketone peroxide and benzoylperoxide.

The invention will now be elucidated by the following, non-restrictive example.

EXAMPLE

A microsphere composition was prepared, comprising the following ingredients:

| | |
|---|---|
| water | |
| microspheres | 91.6 wt % |
| Rohagit | 3.1 wt % |
| 2-amino-2-methylpropanol | 2 wt % |
| NaOH | 1.4 wt % |
| Fatty acid based amine oxide | 1.7 wt % |
| Bromine cresol purple | 0.2 wt % |

The obtained composition was brought to a pH of 9.5 by addition of the 2-amino-2-methylpropanol.

Next, an indicator solution of 0.5 grams bromine cresol purple in 100 ml ethanol and 100 ml water was prepared. This solution was added to the microsphere composition in an amount of 10 ml indicator solution per 100 ml microsphere composition.

A fibrous web, comprising 50% polyester fibers 3.3 dtex having a length of 28 mm and 50% polyester fibers 1.7 dtex having a length of 38 mm, was impregnated with the microsphere composition comprising the indicator solution.

The impregnated web was treated shortly with overheated steam and dried in an oven at 135° C. The thus obtained web had a purple color.

Upon impregnation of the obtained web with a mixture of an ortho phtalic acid unsaturated polyester resin methyl ethyl ketone peroxide hardener and a cobalt accelerator (ratio 100:2:1), a color transition of the web from purple to yellow was observed.

The invention claimed is:

1. A method for preparing a shaped article reinforced with a fibrous web which comprises the steps of
   (a) providing a fibrous web comprising microspheres, in which acid-base web indicator is present throughout the web and
   (b) impregnating said web with a liquid organic resin and a hardener, said indicator evidencing a change in coloration at the point of saturation of the web with the liquid resin.

2. A fibrous web, suitable for use as a shaped article, reinforced with fibrous webbing including an acid-base indicator, which indicator is present throughout the web and is capable of evidencing a change in coloration at the point of saturation of said webbing with a liquid organic resin, wherein the web comprises microspheres.

3. A fibrous web in accordance with claim 2 wherein said indicator is capable of evidencing a change in coloration at the point of saturation of said webbing with a liquid organic resin and a hardener.

4. A fibrous web in accordance with claim 2 wherein the indicator comprises an acid/base indicator dye.

5. A fibrous web in accordance with claim 2 wherein the indicator is selected from the group consisting of bromine thymol blue, bromine cresol purple, bromine cresol green, chlorine phenol red and methyl red.

6. A fibrous web in accordance with claim 2 wherein the web comprises from 30–70% fibers of 3–4 dtex having a length of 20–35 mm and wherein the remaining fibers have a length of 30–50 mm.

\* \* \* \* \*